United States Patent [19]
Yano

[11] 3,948,282
[45] Apr. 6, 1976

[54] METHOD AND DEVICE FOR ATTACHING SHUT-OFF CONTROL VALVE TO DISTRIBUTING WATER PIPE SUCH AS SERVICE PIPE WITHOUT STOPPING PASSAGE OF WATER THERETHROUGH

[75] Inventor: Masatoshi Yano, Suita, Japan
[73] Assignee: Yano Giken Co., Ltd., Osaka, Japan
[22] Filed: Dec. 11, 1974
[21] Appl. No.: 531,749

Related U.S. Application Data
[63] Continuation-in-part of Ser. No. 349,481, April 9, 1973, abandoned.

[30] Foreign Application Priority Data
Apr. 12, 1972 Japan.............................. 47-36014

[52] U.S. Cl. ..................... 137/15; 137/318; 138/89
[51] Int. Cl.² ..................... B23B 41/08; F16E 41/04
[58] Field of Search ............ 137/15, 318, 315, 317, 137/322; 138/89, 92; 285/197, 198, 199

[56] References Cited
UNITED STATES PATENTS
| | | | |
|---|---|---|---|
| 1,898,935 | 2/1933 | Brandriff......................... | 137/318 X |
| 3,799,182 | 3/1974 | Long.............................. | 137/318 X |

Primary Examiner—Alan Cohan
Attorney, Agent, or Firm—Hall & Houghton

[57] ABSTRACT

A method is provided for attaching a water shut-off control valve to a predetermined position on a water distribution pipe, such as, for example, an installed service pipe, without stopping the passage of water therethrough wherein a T-pipe is attached to the damaged water distribution pipe, a first valve assembly is then mounted on the T-pipe assembly, a hole boring assembly is mounted on the free end of the first valve assembly in watertight relation therewith, and a hole then bored into the water distribution pipe and the hole is closed by the first valve member after which the boring assembly is withdrawn. A second valve assembly having an external housing is mounted to the free end of the first valve assembly by means of the external housing and the valve seat of the second valve housing then inserted through the opening and the water distribution pipe locked in place to shut off the flow of water through either distribution pipe and the external housing is thereafter removed. The present invention includes apparatus for carrying out the method.

1 Claim, 11 Drawing Figures

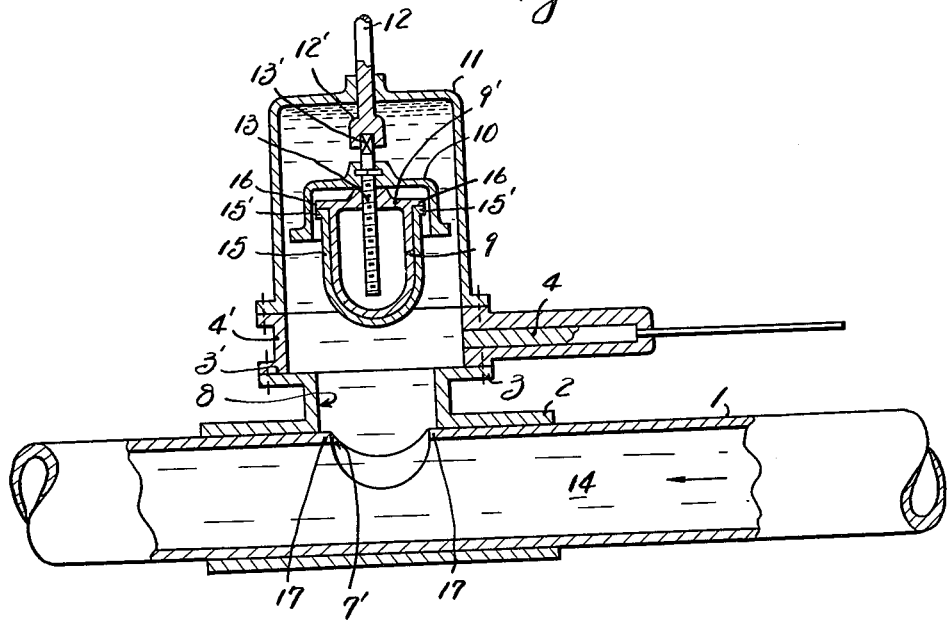
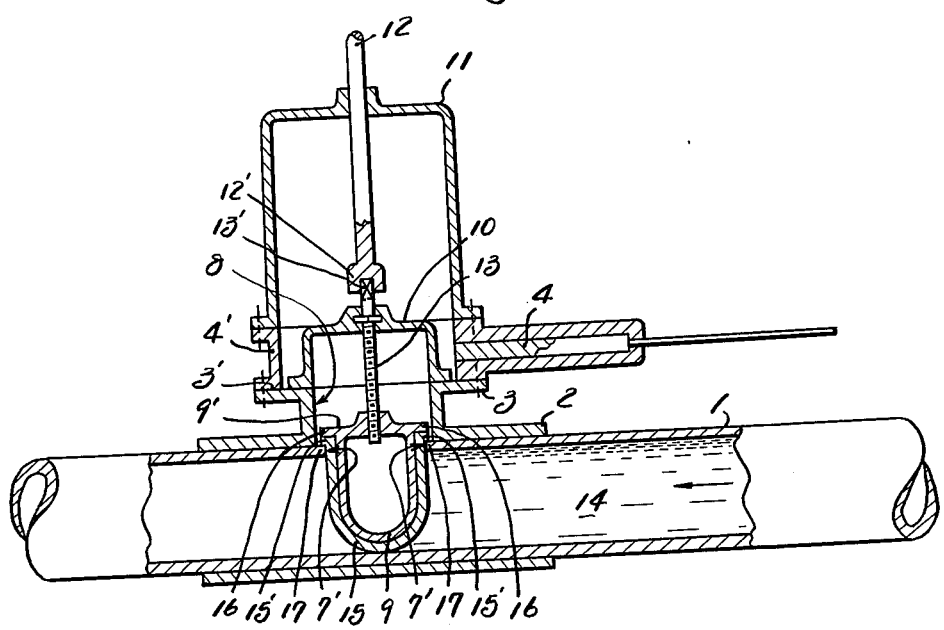

METHOD AND DEVICE FOR ATTACHING SHUT-OFF CONTROL VALVE TO DISTRIBUTING WATER PIPE SUCH AS SERVICE PIPE WITHOUT STOPPING PASSAGE OF WATER THERETHROUGH

RELATED APPLICATION

The present application is a continuation-in-part application of application Ser. No. 349,481, filed Apr. 9, 1973, now abandoned.

BACKGROUND OF THE INVENTION

Field Of The Invention

The present invention relates to a method and device for attaching a shut-off water control valve to a damaged distributing water pipe, such as a service pipe, without stopping passage of water therethrough. Heretofore, when a water distribution pipe, such as, for example, a service main or pipe, has become cracked or otherwise damaged, the entire system may have to be shut down in order to repair the damaged area. The general procedure is to first close the water control valve present in the system to stop the flow of water through the damaged pipe.

Such a suspension of a water supply system which may take place when the system is shut down to permit the repairing, branching and/or severing of water distribution main will cause various drawbacks. For example, in the case where the attaching position of the shut-off water control valve installed in the water-main channel is far away, the section where the water supply is suspended may cover a vast area thereby making it practically impossible to operate the water system.

Summary Of The Invention

The present invention has been developed to solve the above problem inherent in the prior art. Thus, when a portion of a distributing water pipe has become cracked or otherwise damaged, the invention provides for the installation of a water control valve adjacent to or the installation of water control valves on both sides of the cracked area of the pipe without stopping passage of water therethrough, thereby materially restricting the section of the water system where the water supply will be suspended.

BRIEF DESCRIPTION OF THE DRAWING

FIG. 4 is a longitudinal sectional view showing the mounting of the pipe line valve housing to the valve casing mounted on the water pipe.

FIG. 5 is a longitudinal sectional view showing the pipe line valve in installed position in the water pipe.

DESCRIPTION Of THE PREFERRED EMBODIMENT

Figure 1:
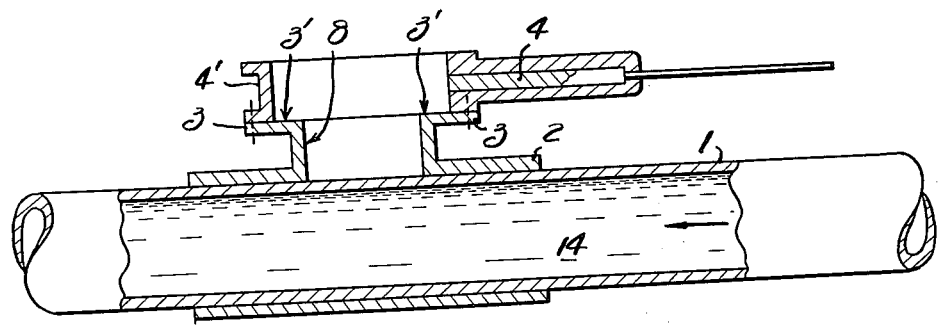
FIG. 1 is a longitudinal sectional view showing the initial mounting of a water control valve made in accordance with the present invention on a water pipe containing a break.

The present invention provides a method of attaching a shut-off water control valve to a water distributing pipe line, such as a service pipe, without stopping passage of water therethrough. The method as shown initially in FIG. 1 comprises mounting a T-pipe assembly 2 by any suitable means around the water distribution pipe 1 on one side of the damaged area of the pipe. The T-pipe assembly 2 has a flange 3 on the short side of the assembly, with the flange 3 having an outer free surface 3' thereon. A water-works control valve, generally designated by reference numeral 4, provided with a valve frame 4' is then mounted on the flange 3 of the pipe assembly 2, with the frame 4' being in flush watertight relationship with the surface 3' of the flange 3. The specific means for accomplishing this attachment is described more fully hereinafter.

Figure 2:
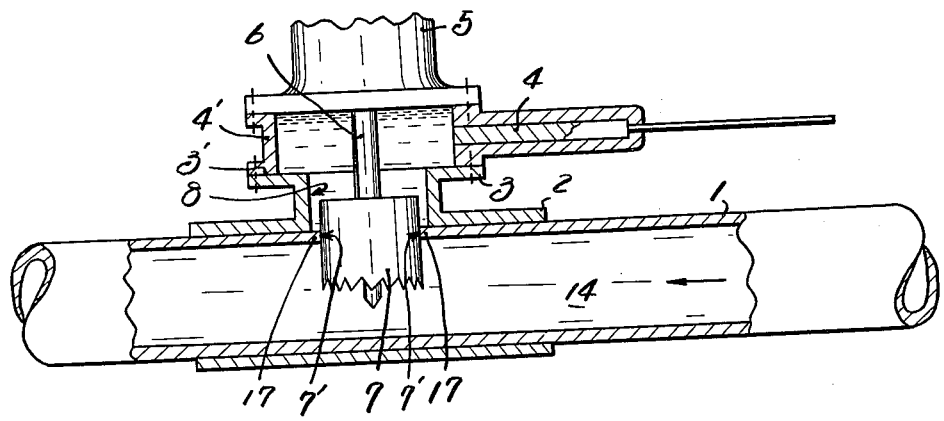
FIG. 2 is a longitudinal sectional view showing the boring of an opening into the water pipe containing a break.
Figure 3:
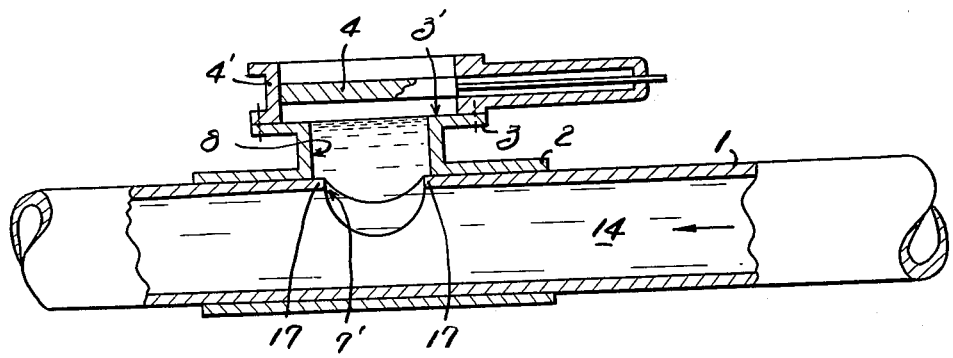
FIG. 3 is a longitudinal sectional view showing the removal of the borer and the closing of the water control valve.

Referring now to FIG. 2, a boring device, generally designated by reference numeral 5, is mounted on the upper free face of the frame 4' of the water control valve 4. The boring device 5 is provided with a spindle 6 having a cutting member 7 secured to its lower free end. The boring device 5 is actuated, as shown in FIG. 3, to cut a round opening 7' in the damaged water distribution main or pipe 1, the diameter of the round opening 7' being the same as the diameter of the water distribution pipe 1. After the opening 7' has been formed, the spindle 6 and the cutting member 7 are withdrawn upwardly into the housing of the boring device 5 and the valve seat 4'' of the valve 4 is immediately advanced to close and seal off the communication opening 8 of the T-pipe assembly 2. The boring device 5 is then removed, leaving the assembly, as shown in FIG. 3, with the hole 7' having been bored into the damaged water main 1 without stopping the flow of water therethrough.

As shown in FIG. 4, after the boring device 5 has been removed, a shut-off water control valve assembly, generally designated by reference numeral 9, is mounted on the free end of the frame 4' of the water control valve 4 in watertight relationship by means to be described more fully hereinafter. The water control valve assembly 9 is provided with an external housing 11 having a peripheral flange at its bottom end thereof which is placed in attached watertight the with the free surface of the flanged portion of the frame 4' of the valve 4. The water control valve 9 further includes a valve seat 9', a housing 10, and an elongated screw rod 13 threadedly engaged to the upper end of the valve seat 9'. The water control valve assembly 9 also includes an actuating rod 12 having its upper end mounted in the top of the housing and secured at its lower end 12' to the upper free end 13' of the screw rod 13.

After the external housing 11 of the valve assembly 9 has been attached to the valve assembly 4, the valve seat 4'' of the valve assembly 4 is withdrawn, opening the passage 8 of the T-pipe assembly 2. The actuating rod 2 is thereafter rotated causing the valve seat 9' to move downwardly on the rod 13 through the opening 7' and into the channel 14 of the water distribution pipe. As the valve seat 9' is rotated downwardly, the valve housing 10 provided with a peripheral flange portion at its bottom end moves downwardly and engages with and is attached to the flange surface 3' of the flange 3 of the T-assembly 2 in watertight relationship therewith. The actuation of the rod 12 is continued until the valve seat 9' completely seals and closes off the channel 14 of the water main 1. This closed position of the assembly is clearly illustrated in FIG. 5.

Figure 6:
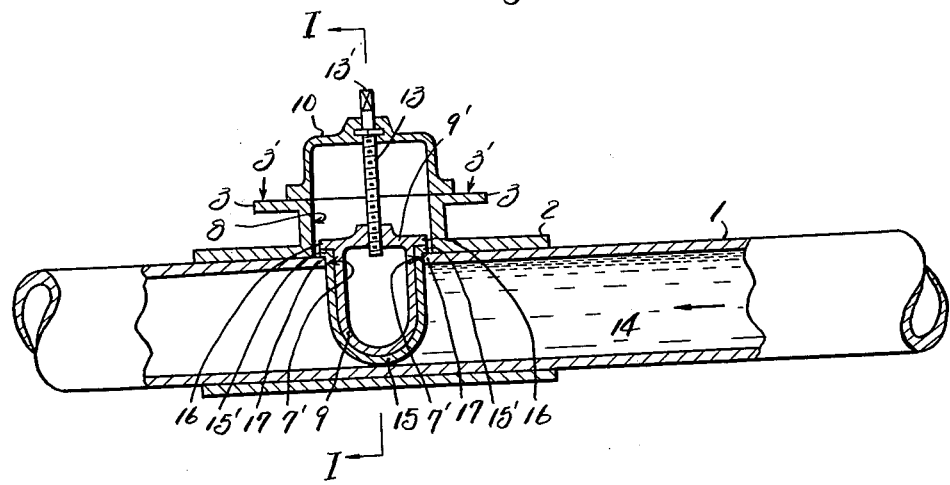
FIG. 6 is a longitudinal sectional view similar to FIG. 5 with the pipe line valve housing removed.
Figure 7:
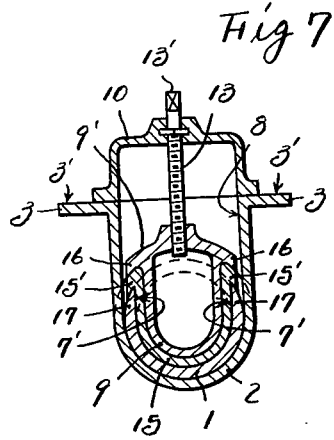
FIG. 7 is a section taken along the line I—I of FIG. 6.

After the water distribution main has been closed off as shown in FIG. 4, the external housing 11 of the water valve assembly 9 is disconnected from the frame 4' of the water control valve 4. The water control valve 4 is thereafter disconnected from the flange 3 of the T-assembly 2 leaving the water distribution main 1 in a closed state, as shown in FIGS. 6 and 7.

Figure 8:
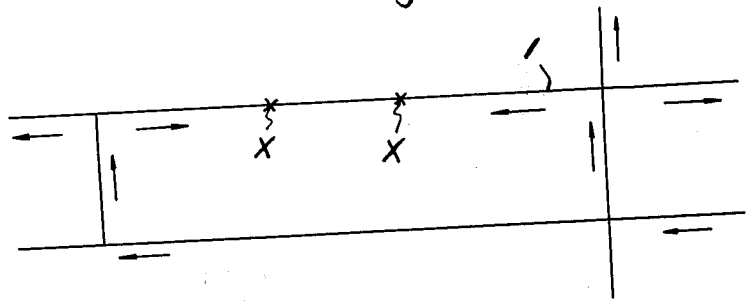
FIG. 8 is an explanatory view showing the usual manner in which service pipes are installed.

It is therefore seen that by utilization the present invention the water system can be operated with shut-off water control valves being in installed relationship in the water main channel. The damaged section of the water main where the water supply has to be suspended in order to carry out the repair is minimized in size. As has been noted hereinbefore, the water control valve may be installed on both sides of the damaged area of the pipe. In this connection the water distribution pipe, in the case of a large city, is laid out in a pipe netting fashion, as shown in FIG. 8. As illustrated therein, even if a water discharge pipe is shut off at X, there will be no suspension of the water distribution at both ends thereof.

The present invention also includes as a part of the invention the device for attaching a shut-off water control valve to a water distributing pipe, such as a service pipe, without stopping passage of water therethrough. The device comprises a water-works water control valve 4 attached in watertight relation to the outer surface 3' of the flange 3 of a T-pipe assmbly which, in turn, is attached in watertight relationship to the water distributing main 1, such as a service pipe, a boring device 5 provided with a spindle 6 which has a cutting edge 7 at the front end thereof for forming an opening in the water distributing pipe, thereby forming a passageway therewith. The boring device 5 is attached to the frame 4' of said water control valve 4, with the round opening 7' being formed in the main 1 and having the same diameter as the water main 1. The spindle 6 and hence the cutting edge 7 of the boring device 5 are withdrawn and the communication opening 8 in the T-pipe assembly 2 is closed by the valve seat 4'' of the water conttol valve 4. The boring device 5 is thereafter removed from the valve 4 thereby effecting the boring of the water main 1 without stopping the passage of water therethrough.

A valve installing device containing a shut-off water control valve assembly 9, a valve or cover housing 10, and an external housing 11, is mounted on the valve 4. This is accomplished by attaching the flange portion of the housing 11 to the frame 4' of the water control valve 4. The valve assembly further includes a screw rod 13 freely mounted in rotatable relationship in the valve cover 10 and adapted to be turned by the actuating rod 12 so that the screw rod can be threadedly advanced into and retracted from the top plate 9'' of the shut-off water control valve assembly 9 to shut off or open the channel 14 in the water main 1. The actuating rod 12 is loosely fitted in the top of the housing 11 of the valve assembly 9, with the lower end 12' of the actuating rod being operatively engaged with the upper projecting end 13 of said screw rod 13. The upper flange 15' of a rubber lining 15 is fitted over the shut-off water control valve seat 9' and is adapted to be tightly inserted betwen the upper flange 16 of the valve seat 9' and the opening edge 17 of the water main 1. It is to be noted that the T-pipe is of the split type so that it can be easily attached to the water main 1.

Figure 9:
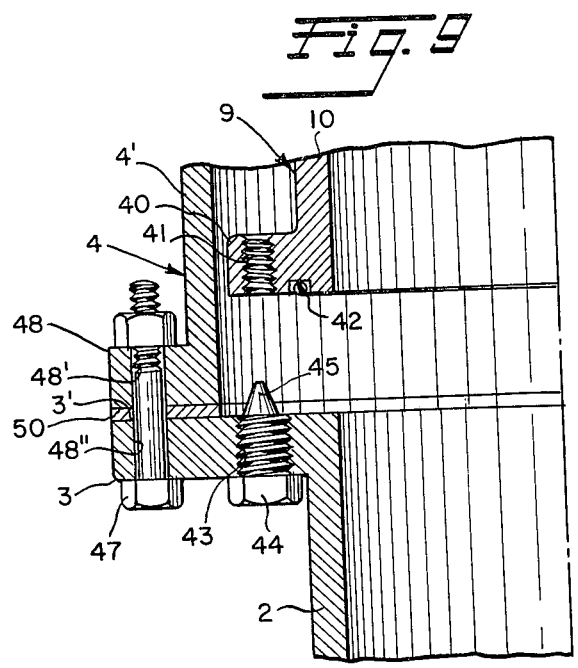
FIG. 9 is an enlarged fragmentary cross-sectional view illustrating the initial aligning of the water assembly for attachment to the assembly mounted on the pipe line.
Figure 10:
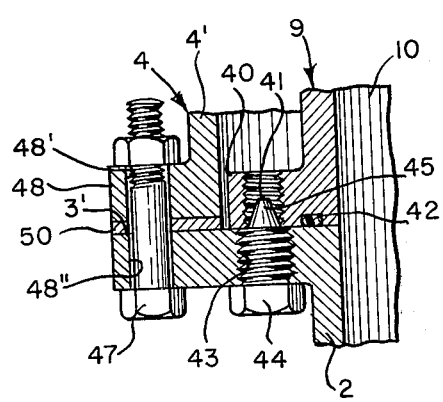
FIG. 10 is a view similar to that shown in FIG. 9 with the valve assembly in attached relationship to the pipe line mounted assembly.
Figure 11:
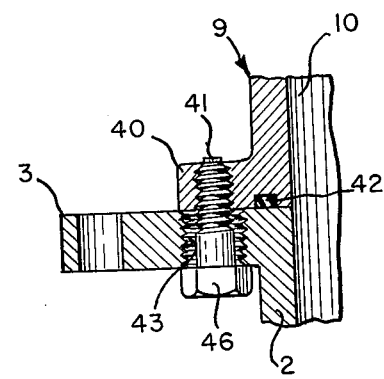
FIG. 11 is a view similar to that shown in FIG. 10 illustrating how the valve housing is removed.

Reference is now to be had to FIGS. 9, 10 and 11 wherein the attaching means for the securing of the valve assembly 4 and the valve assembly 9 to the T-pipe assembly 2 is shown in greater particularity and detail. In FIGS. 9-11, reference will be had only to one attaching means for securing the valve assemblies to the T-pipe assembly, but it is to be understood that there may be a plurality of the attaching means spaced around he periphery to the extent necessary to insure the proper securing of the valve assemblies to the T-pipe assembly in watertight relationship, as indicated by the vertical cross-lines in FIGS. 1–5.

Referring now to FIG. 9, the frame 4' of the valve assembly 4 is provided with a peripheral flange portion 48 at the bottom end thereof, with such flange portion 48 being provided with an opening 48' therethrough. The opening 48' is in vertical alignment with an opening 48'' formed in the peripheral flange 3 of the T-pipe assembly 2. A nut and bolt assembly 47 extends through the openings 48' and 48'' of the respective flanges to lock the valve assembly 4 to the T-pipe 2 in watertight engagement. If desired, a sealing gasket 50 may be provided between the mating surfaces of the flange portions 48 and 3. This engagement is clearly shown in FIGS. 1–5.

The valve cap or housing 10 of the valve assembly 9 is provided with a peripheral flange portion 40 with the diameter of such flange portion 40 being less than the internal diameter of the valve assembly 4 through which the housing will pass. The flange 40 of the housing 10, as shown, is provided with a threaded screw hole 41 therein, with the free surface of the housing 10 having a circular recess or raceway formed therein inwardly of the threaded opening 41, with an O-ring 42 being mounted in the recess and will function to seal the mating surfaces in watertight relationship. The flange 3 of the T-pipe assembly 2 is provided with a threaded opening 43, which is in vertically aligned relationship with the threaded opening 41 of the flange 40 of the housing 10. However, the threaded opening 43 of the flange 3 has a diameter greater than that of the opening 41. A plug bolt 44 having a guide cone 45 at the free end thereof is threaddedly affixed in the opening 43. The guide cone 45 of the bolt 44 extends above the flange surface 3' of the flange 3 of the T-pipe assembly 2 and functions to act as a guide for the registry and alignment of the flange 40 and its threaded opening 41 with the flange 3. The plug bolt 41 when in an installed position will prevent a leakage of water through the opening before a final connection has been achieved and with the guide cone 45 facilitating the registry at the threaded opening 41 of the valve housing 10 with the screw holes 43 of the flange 3. This registry is shown in FIG. 10.

To attain the final and permanent attachment of the valve assembly 9 to the T-pipe assembly 2, reference is to be had to FIG. 11. This final attachment is achieved after the registry of the threaded openings 41 and 43 of the housing 10 and the flange 3, respectively, has been attained. The plug bolt 44 is withdrawn from the threaded opening 43 and a threaded locking bolt 46 having a diameter corresponding to the diameter of the threaded opening 41 is passed through the threaded opening 43 and threaded into the threaded opening 41. The locking bolt 46 is thereafter securely tightened in the threaded opening 41 to secure the housing 10 of the valve assembly 9 into watertight relationship with the flange surface 3' of the flange 3 of the T-pipe assembly 2 after this has been accomplished. Th valve assembly 4 is removed from the unit by loosening and removing the nut and bolt assembly 47 from the openings 48' and 48''. The valve assembly 4 will then be disengaged and removed from the outer surface 3' of the flange 3 of the T-pipe assembly. The installed device will therefore be in the form shown in FIG. 11.

While there have been described herein what are at present considered preferred embodiments of the several features of the invention, it will be obvious to those skilled in the art that modifications and changes may be made without departing from the essence of the invention. It is therefore to be understood that the exemplary embodiments thereof are illustrative and not restrictive of the invention, the scope of which is defined in the appended claims and that all modifications that come within the meaning and range of equivalency of the claims are intended to be included therein.

I claim:
1. A method of attaching a shut-off valve to a water distribution pipe without stopping the flow of water therethrough comprising tightly attaching a flanged T-pipe to the surface of the water distributing pipe, attaching one end of a water control valve unit to the outer end surface of said flanged T-pipe, attaching a boring unit to the other end of said water control valve unit, actuating said boring unit to move in a direction transverse to that of the water distribution pipe to form a round opening in only one side of said water distribution pipe having a diameter equal to that of the water distribution pipe, closing the opening of the flange T-pipe, removing the boring unit from the water control valve unit, attaching a valve installing unit to the open end of said water valve unit, said valve installing unit including a water shut-off valve, a valve cover, and a detachable housing, securing the peripheral bottom portion of said housing to the upper peripheral portion of said water control upper valve unit, actuatiing the valve installing unit to lower the water shut-off valve into the formed opening of the water distribution pipe to close the channel thereof, fixing the valve cover to the flange portion of said T-pipe, removing the detachable housing from the water control unit, and removing the said water control valve unit from said flanged T-pipe.

* * * * *